(12) United States Patent
Krichever et al.

(10) Patent No.: US 6,988,663 B2
(45) Date of Patent: Jan. 24, 2006

(54) MOVABLE SCANNING ARRAY IN ELECTRO-OPTICAL READERS

(75) Inventors: Mark Krichever, Hauppague, NY (US); Vladimir Gurevich, Stony Brook, NY (US); Dmitriy Yavid, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 188 days.

(21) Appl. No.: 10/455,084

(22) Filed: Jun. 5, 2003

(65) Prior Publication Data

US 2004/0245337 A1 Dec. 9, 2004

(51) Int. Cl.
G06G 3/10 (2006.01)
(52) U.S. Cl. .......................... 235/462.23; 235/462.35; 235/454
(58) Field of Classification Search ........... 235/462.35, 235/462.32, 462.24, 462.22, 462.23, 454, 235/462.2, 462.25
See application file for complete search history.

(56) References Cited

U.S. PATENT DOCUMENTS

| | | | | |
|---|---|---|---|---|
| 4,689,291 A | * | 8/1987 | Popovic et al. | 430/321 |
| 5,010,534 A | * | 4/1991 | Enari et al. | 369/30.16 |
| 5,341,354 A | * | 8/1994 | Horiguchi | 369/44.11 |
| 5,612,821 A | * | 3/1997 | Schmutz | 359/622 |
| 5,691,836 A | * | 11/1997 | Clark | 359/247 |
| 6,650,472 B1 | * | 11/2003 | Adachi et al. | 359/453 |
| 2004/0238638 A1 | * | 12/2004 | Gofman et al. | 235/462.32 |

* cited by examiner

*Primary Examiner*—Diane I. Lee
(74) *Attorney, Agent, or Firm*—Kirschstein, et al.

(57) ABSTRACT

Scanning in an electro-optical reader for reading indicia is obtained by moving one array of microlenses relative to another microlens array. An outgoing laser beam directed to indicia for reflection therefrom and/or return light reflected from the indicia is steered through a scan angle by the moving array.

19 Claims, 3 Drawing Sheets

MOVABLE SCANNING ARRAY IN ELECTRO-OPTICAL READERS

BACKGROUND OF THE INVENTION

1. Field of the Invention

The present invention generally relates to electro-optical systems for reading indicia, for example, bar code symbols, having parts with different light reflectivities and, in particular, to an arrangement for, and a method of, scanning a light beam or a field of view by performing relative motion between a pair of microlens arrays or like optical elements.

2. Description of the Related Art

Various electro-optical readers and systems have previously been developed for reading bar code symbols appearing on a label, or on a surface of a target. The bar code symbol itself is a coded pattern of indicia. Generally, the readers electro-optically transform graphic indicia of the symbols into electrical signals which are decoded into alphanumeric characters. The resulting characters describe the target and/or some characteristic of the target with which the symbol is associated. Such characters typically comprise input data to a data processing system for applications in point-of-sale processing, inventory control, article tracking and the like.

The specific arrangement of symbol elements, e.g., bars and spaces, in a symbol defines the characters represented according to a set of rules and definitions specified by a code or symbology. The relative size of the bars and spaces is determined by the type of code used, as is the actual size of the bars and spaces.

To encode a desired sequence of characters, a collection of element arrangements is concatenated to form the complete symbol, with each character being represented by its own corresponding group of elements. In some symbologies, a unique "start" and "stop" character is used to indicate where the symbol begins and ends. A number of different bar code symbologies presently exists. The symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of elements vertically instead of extending elements horizontally. That is, there are several rows of bar and space patterns, instead of one long row. The structure of Code 49 is described in U.S. Pat. No. 4,794,239. Another two-dimensional code structure known as PDF417 is described in U.S. Pat. No. 5,304,786.

Electro-optical readers have been disclosed, for example, in U.S. Pat. No. 4,251,798; No. 4,369,361; No. 4,387,297; No. 4,409,470, No. 4,760,248 and No. 4,896,026, all of which have been assigned to the assignee of the present invention. These readers generally include a light source consisting of a gas laser or semiconductor laser for emitting a light beam. The use of semiconductor devices as the light source in readers is especially desirable because of their small size, low cost and low power requirements. The laser beam is optically modified, typically by a focusing optical assembly, to form a beam spot having a certain size at a predetermined target location. Preferably, the cross-section of the beam spot at the target location approximates the minimum width between symbol regions of different light reflectivity, i.e., the bars and spaces.

In conventional readers, the light beam is directed by a scan component along a light path toward a target symbol. The reader operates by repetitively scanning the light beam in a scan pattern, for example, a line or a series of lines across the target symbol by movement of the scan component such as a mirror disposed in the path of the light beam. The scan component may sweep the beam spot across the symbol, trace a scan line across and beyond the boundaries of the symbol, and/or scan a predetermined field of view.

Readers also include a sensor or photodetector which functions to detect light reflected or scattered from the symbol. The photodetector or sensor is positioned in the reader in an optical path so that it has a field of view which extends at least across and slightly beyond the boundaries of the symbol. A portion of the light beam reflected from the symbol is detected and converted into an analog electrical signal. A digitizer digitizes the analog signal. The digitized signal from the digitizer is then decoded, based upon the specific symbology used for the symbol, into a binary data representation of the data encoded in the symbol. The binary data may then be subsequently decoded into the alphanumeric characters represented by the symbol.

The scan pattern that scans the symbol can take a variety of forms, such as repeated line scan, standard raster scan, jittered raster scan, fishbone, petal, etc. These beam patterns are generated by controlled motions of the scan component in the beam path. Typically, the scan component is driven by some form of scanning motor to periodically deflect the beam through the desired beam scanning pattern. For a repeated line scan beam pattern, a polygonal mirror unidirectionally rotated by a simple motor can be utilized. For more complex beam patterns, more involved drive mechanisms are required.

The frequency at which the beam pattern is executed is also an important consideration. The more times a symbol can be scanned in a given time period, the chances of obtaining a valid read of the symbol are increased. This is particularly important when the symbols are borne by moving objects, such as packages traveling on a conveyor belt.

Many applications call for a hand-held reader where a user aims the light beam at the symbol, and the beam executes a scan pattern to read the symbol. For such applications, the arrangement of electro-optical components must be compact in order to be accommodated in a hand-held package which may be pistol-shaped. Moreover, such readers must be lightweight and structurally robust to withstand physical shock resulting from rough handling. It is also desirable that minimal power be consumed during operation to promote battery usage.

It is known to scan the light beam or field of view by reflecting the light beam or scattered light off a scan mirror that is oscillated. The scan mirror occupies a non-negligible volume and adds weight to the reader. Rather than relying on reflection, it is also known to provide beam steering by shifting a focusing lens through which the beam passes. However, a too large lens shift is needed in order to achieve a usable scan angle for the beam.

SUMMARY OF THE INVENTION

OBJECTS OF THE INVENTION

One object of this invention is to provide an improved arrangement for and method of scanning a light beam or field of view in a reader for reading a data-encoded symbol.

Another object of this invention is to provide an arrangement which is miniature, compact, lightweight, durable and power efficient in operation, and thus is ideally suited for portable hand-held applications.

Still another object of this invention is to achieve a usable scan angle for a beam to be swept across the symbol by using the transmittance property of a miniature scan component.

FEATURES OF THE INVENTION

In keeping with these objects and others which will become apparent hereinafter, one feature of this invention resides, briefly stated, in an arrangement for, and a method of, scanning at least one of a light beam directed along an outgoing path toward indicia to be read for reflection therefrom, and a field of view of a detector operative for detecting return light reflected along a return path from the indicia in a reader for electro-optically reading indicia, such as one- and/or two-dimensional bar code symbols.

The scanning is achieved by performing relative motion between a pair of optical elements through which the light beam and/or the return light passes. Preferably, the optical elements are arrays of microlenses in mutual parallelism, each array extending perpendicular to at least one of the paths. A drive performs the relative motion along a drive direction perpendicular to said at least one path to steer the light beam and/or the return light over a scan angle.

The required movement of one array relative to another is very small to achieve a usable scan angle. For example, each array comprises at least one row of microlenses extending lengthwise of the array. The distance between two adjacent microlenses, also known as the pitch of the array, measures in the tens of micrometers in a preferred embodiment, and the amount of movement for the moving array corresponds to the array pitch. This minimal movement minimizes power consumption, vibration, noise, and overall size and weight of the arrangement and still achieves practical scan angles on the order of ±20°.

Each array may comprise a single linear row, or mutually orthogonal rows. Each mircolens could be spherical for two-dimensional scanning, or cylindrical for one-dimensional scanning. Each microlens array could be substituted with a diffractive optical element (DOE) or a holographic element.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
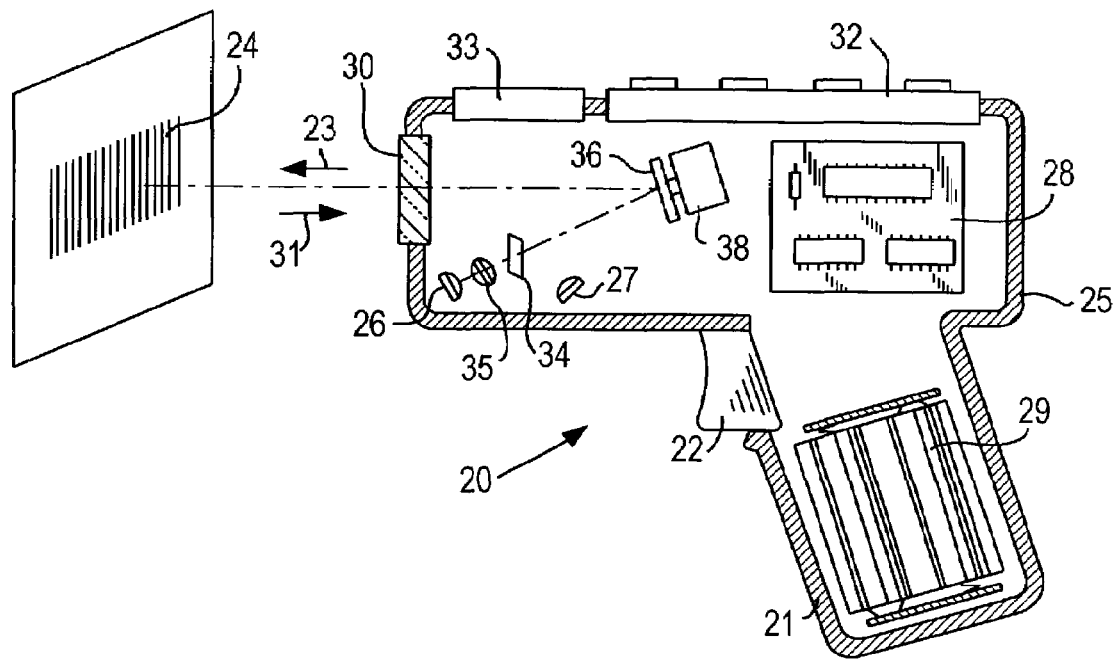
FIG. 1 is a schematic diagram of a hand-held reader for reading a bar code symbol in accordance with the prior art.
Figure 2:
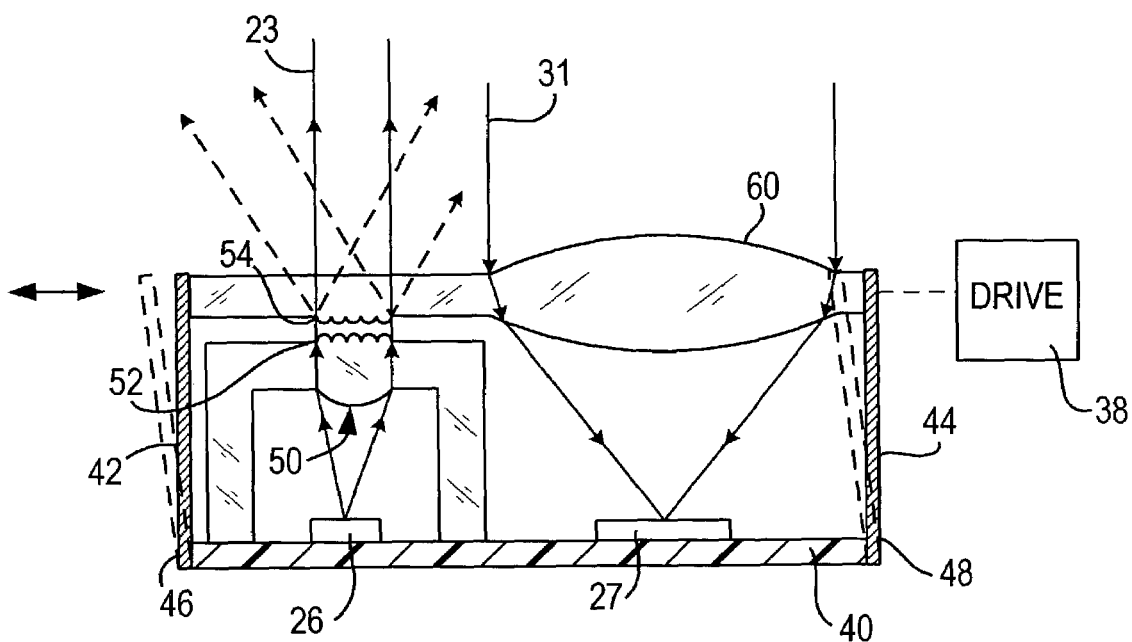
FIG. 2 is a side view of a scanning arrangement in accordance with this invention for use in the reader of FIG. 1.

Reference numeral 20 in FIG. 1 generally identifies a hand-held reader for electro-optically reading indicia, such as bar code symbol 24, located in a range of working distances therefrom. The reader 20 has a pistol grip handle 21 and a manually actuatable trigger 22 which, when depressed, enables a light beam 23 to be directed at the symbol 24. The reader 20 includes a housing 25 in which a light source 26, a light detector 27, signal processing circuitry 28, and a battery pack 29 are accommodated. A light-transmissive window 30 at a front of the housing enables the light beam 23 to exit the housing, and allows return light 31 scattered off the symbol to enter the housing. A keyboard 32 and a display 33 may advantageously be provided on a top wall of the housing for ready access thereto.

In use, an operator holding the handle 21 aims the housing at the symbol and depresses the trigger. The light source 26 emits a light beam which is optically modified and focused by optics 35 to form a beam spot on the symbol 24. The beam passes through a beam splitter 34 to a scan mirror 36 which is repetitively oscillated at a scan rate of at least 20 scans a second by a motor drive 38. The scan mirror 36 reflects the beam incident thereon to the symbol 24 and sweeps the beam spot across the symbol in a scan pattern. The scan pattern can be a line extending lengthwise along the symbol along a scan direction, or a series of lines arranged along mutually orthogonal directions, or an omni-directional pattern, just to name a few possibilities.

The reflected return light 31 has a variable intensity over the scan pattern and passes through the window 30 onto the scan mirror 36 where it is reflected onto the splitter 34 and, in turn, reflected to the photodetector 27 for conversion to an analog electrical signal. As known in the art, the signal processing circuitry 28 digitizes and decodes the signal to extract the data encoded in the symbol.

In accordance with this invention, the beam splitter 34, optics 35 and scan mirror 36 are replaced by a pair of optical elements movable relative to each other, as described herein with reference to FIGS. 2–6. As shown in a non-retroreflective embodiment of FIG. 2, a support 40, preferably a printed circuit board, is mounted within the housing 25. A pair of upright resilient arms 42, 44 is movable about respective first 46 and second 48 axes of oscillation. Each arm is preferably constituted of a metallic spring steel, but other resilient materials including plastic could be employed. In the illustrated solid line rest position, the arms 42, 44 are parallel. In the preferred embodiment, the arms 42, 44 are planar leaf springs.

The light source 26, preferably a laser diode, is mounted on the board 40 and emits a laser beam to and through a focusing lens 50 for optically modifying the beam to form the beam spot of the required size and shape on the symbol 24. The beam then passes in succession through a first optical array 52 of microlenses and a second optical array 54 of microlenses prior to exiting the housing as the outgoing laser beam 23.

Figure 3:
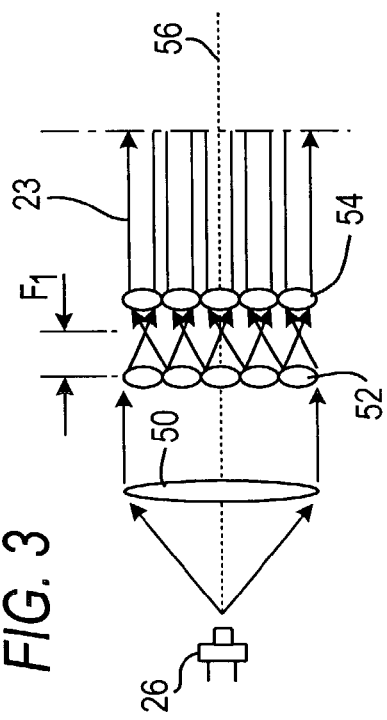
FIGS. 3 and 4 are diagrammatic views of a scanning arrangement in accordance with one embodiment of this invention prior to, and after, movement of a microlens array.

The optical arrangement of the arrays 52, 54 relative to the focusing lens 50, as described so far, is depicted in FIG. 3. The arrays 52, 54 are parallel to each other. Each array extends perpendicular to an optical axis 56 along which the laser beam 23 is transmitted. Each array comprises either a single linear row of microlenses, or two mutually orthogonal rows of microlenses lying in a plane perpendicular to the optical axis 56. Each microlens is preferably spherical for forming the beam spot with a circular cross-section for scanning two-dimensional symbols, or is preferably cylindrical for forming the beam spot with an elliptical cross-section for scanning one-dimensional symbols. Other lens shapes are contemplated. Each microlens can have a positive or a negative power. Each microlens of the first array 52 has a focal length F1. Each microlens of the second array 54 has a focal length F2. To maintain laser beam power constant during scanning, it is preferable for F2 to be less than or equal to F1.

Returning to FIG. 2, the focusing lens 50 and the first array 52 are preferably injection molded as a single stationary optical component that is stationarily mounted on the board 40. The second array 54 is likewise molded as a single movable optical component with a collection lens 60 operative for collecting the return light 31 and focusing the collected light onto the photodetector 27, which is likewise mounted on the board 40 adjacent the laser diode 26. The single movable optical component of which the collection lens 60 and the second array 54 are comprised is mounted on the resilient arms 42, 44 for oscillating movement relative to the board 40, and is driven by the drive 38. The drive is preferably a linear drive such as a piezo-electric motor, but other drives are contemplated. For example, the drive may include an energizable electromagnetic coil operative for generating an alternating electromagnetic field when energized by a periodic drive signal, as well as a permanent magnet mounted on the movable optical component. The magnetic field of the magnet interacts with the alternating field of the coil, thereby moving the magnet jointly with the movable optical component.

Figure 4:
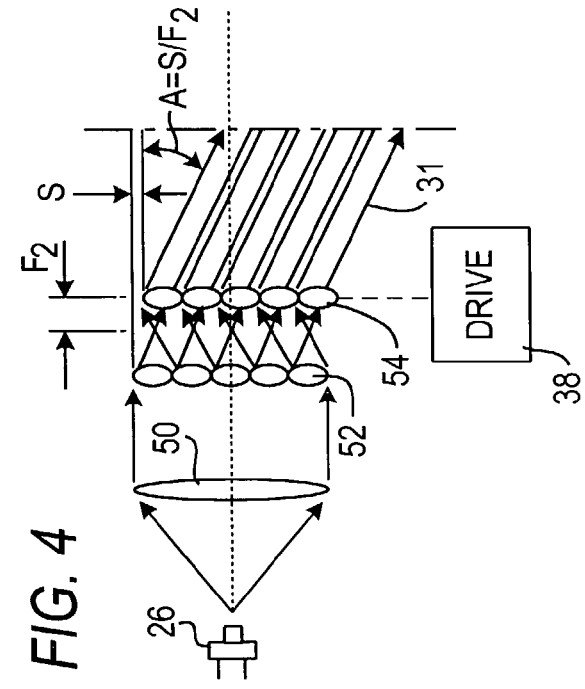

FIG. 4 is analogous to FIG. 3, but shows the second array 54 after it has been moved through a distance S by the drive 38. This movement causes the laser beam 23 to be steered through a scan angle A. Expressed mathematically, the laser beam is deflected by an angle A=atan (S/F2). For example, if S=0.018 mm and F2=0.050 mm; then A=±20°.

Figure 5:
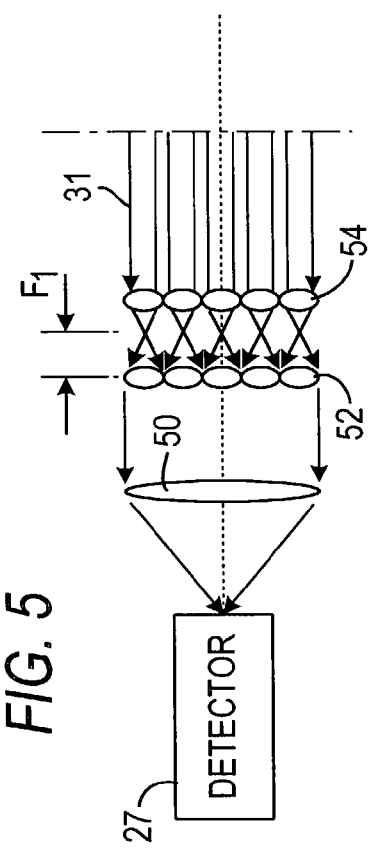
FIGS. 5 and 6 are analogous to FIGS. 3 and 4, but of another embodiment of this invention.
Figure 6:
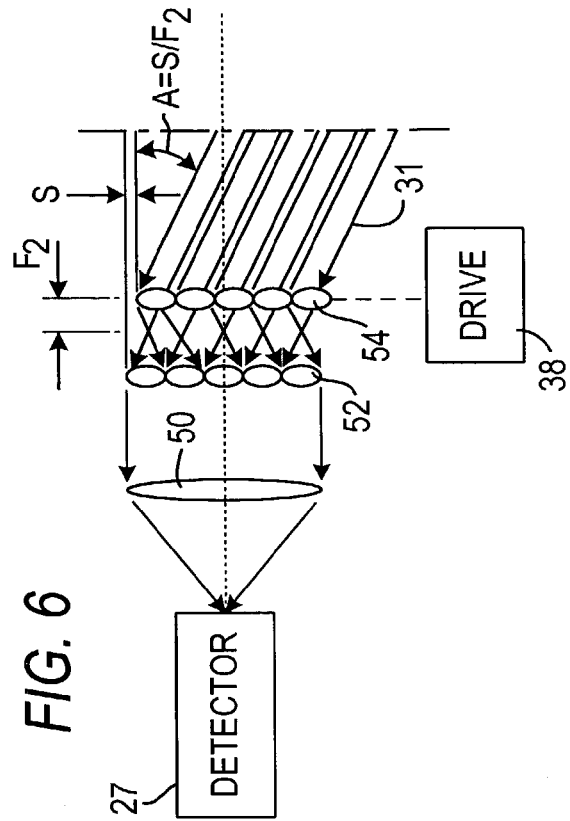

Rather than using a convex collection lens 60, the return light 31 can likewise be passed through the pair of arrays 52, 54, as shown in a retroreflective embodiment of FIGS. 5 and 6, en route to the detector 27. Array 54 is shifted by the drive 38, as described above, the steer the return light 31 over the symbol 24. In this way, the field of view of the detector 27 is scanned.

It will be understood that each of the elements described above, or two or more together, also may find a useful application in other types of constructions differing from the types described above.

While the invention has been illustrated and described as embodied in a scanning arrangement in electro-optical readers operative by movement of one microlens array relative to another, it is not intended to be limited to the details shown, since various modifications and structural changes may be made without departing in any way from the spirit of the present invention. For example, relative motion between a pair of diffractive optical elements, or a pair of holographic elements, could likewise be employed.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a reader for electro-optically reading indicia by directing a light beam along an outgoing path toward the indicia for reflection therefrom, and by detecting return light reflected along a return path from the indicia over a field of view, an arrangement for scanning at least one of the light beam and the field of view, the arrangement comprising:
   a) a first optical array of microlenses through which at least one of the light beam and the return light is transmitted, the first array extending perpendicular to at least one of the paths;
   b) a second optical array of microlenses through which said at least one of the light beam and the return light is transmitted, the second array extending parallel to the first array; and
   c) a drive for oscillating one of the arrays relative to the other of the arrays along opposite drive directions perpendicular to said at least one path for steering said at least one of the light beam and the return light over a scan angle.

2. The arrangement of claim 1, wherein each array is an injection molded element constituted of a light-transmissive material.

3. The arrangement of claim 1, wherein each microlens is a spherical lens.

4. The arrangement of claim 1, wherein each microlens is a cylindrical lens.

5. The arrangement of claim 1, wherein each array includes microlenses arranged along a linear row.

6. The arrangement of claim 1, wherein each array includes microlenses arranged along mutually orthogonal linear rows.

7. The arrangement of claim 1, wherein the first array includes a plurality of first lenses each having a first focal length, and wherein the second array includes a plurality of second lenses each having a second focal length, and wherein the first focal length is at least equal to the second focal length.

8. The arrangement of claim 1, and further comprising a light source for emitting the light beam, and an optical element for directing the light beam across one of the arrays.

9. The arrangement of claim 8, wherein the optical element and the first array are a single injection molded component constituted of a light-transmissive material.

10. The arrangement of claim 1, and further comprising a light detector for detecting the return light, and an optical element for directing the return light across one of the arrays.

11. In a method of electro-optically reading indicia by directing a light beam along an outgoing path toward the indicia for reflection therefrom, and by detecting return light reflected along a return path from the indicia over a field of view, a method of scanning at least one of the light beam and the field of view, the method comprising the steps of:
   a) transmitting at least one of the light beam and the return light through a first optical array of microlenses, the first array extending perpendicular to at least one of the paths;
   b) transmitting said at least one of the light beam and the return light through a second optical array of microlenses, the second array extending parallel to the first array; and
   c) oscillating one of the arrays relative to the other of the arrays along opposite drive directions perpendicular to said at least one path for steering said at least one of the light beam and the return light over a scan angle.

12. The method of claim 11, and injection molding each array from a light-transmissive material.

13. The method of claim 11, and shaping each microlens as a spherical lens.

14. The method of claim 11, and shaping each microlens as a cylindrical lens.

15. The method of claim 11, and arranging the microlenses of each array along a linear row.

16. The method of claim 11, and arranging the microlenses of each array along mutually orthogonal linear rows.

17. The method of claim 11, wherein the first array includes a plurality of first lenses each having a first focal length, and wherein the second array includes a plurality of second lenses each having a second focal length, and wherein the first focal length is at least equal to the second focal length.

18. The method of claim 11, and emitting the light beam from a light source, and focusing the light beam across one of the arrays.

19. The method of claim 11, and detecting the return light with a light detector, and focusing the return light across one of the arrays.

* * * * *